(12) United States Patent
Legg (10) Patent No.: US 7,729,307 B2
(45) Date of Patent: Jun. 1, 2010

(54) SCHEDULING DATA ACROSS A SHARED COMMUNICATION LINK IN A CELLULAR COMMUNICATION SYSTEM

(75) Inventor: Peter J. Legg, Swindon (GB)

(73) Assignee: IPWireless, Inc., San Francisco, CA (US)

(*) Notice: Subject to any disclaimer, the term of this patent is extended or adjusted under 35 U.S.C. 154(b) by 625 days.

(21) Appl. No.: 10/941,551

(22) Filed: Sep. 14, 2004

(65) Prior Publication Data

US 2006/0056373 A1 Mar. 16, 2006

(51) Int. Cl.
*H04W 4/00* (2009.01)

(52) U.S. Cl. .................. 370/329; 370/331; 370/335; 370/334; 710/107

(58) Field of Classification Search .......... 370/329, 370/310, 315, 320, 330, 332, 335, 336, 341–344, 370/345, 347, 331, 334, 235, 328; 710/107
See application file for complete search history.

(56) References Cited

U.S. PATENT DOCUMENTS

| | | | |
|---|---|---|---|
| 6,262,980 B1 * | 7/2001 | Leung et al. ............... | 370/336 |
| 6,438,134 B1 * | 8/2002 | Chow et al. ............... | 370/412 |
| 6,507,567 B1 * | 1/2003 | Willars ..................... | 370/321 |
| 7,042,856 B2 * | 5/2006 | Walton et al. .............. | 370/329 |
| 7,072,911 B1 * | 7/2006 | Doman et al. .............. | 707/201 |
| 2003/0103497 A1 | 6/2003 | Speight | |
| 2004/0218569 A1 * | 11/2004 | Pedersen et al. ........... | 370/334 |

FOREIGN PATENT DOCUMENTS

| | | |
|---|---|---|
| EP | 0859492 A2 | 8/1998 |
| EP | 0981228 A2 | 2/2000 |

OTHER PUBLICATIONS

Holma, H. et al. eds. (2001). *WCDMA for UMTS: Radio Access for Third Generation Mobile Communications*. John Wiley & Sons Ltd.: West Sussex, England, 10 pages (Table of Contents).

International Search Report mailed May 23, 2006, for PCT Application No. PCT/EP2005/054637 filed Sep. 18, 2005, 2 pages.

Mouly, M. et al. (1992). *The GSM System for Mobile Communications*. Telecom Publishing: Olympia, Washington, 8 pages (Table of Contents).

* cited by examiner

*Primary Examiner*—Patrick N Edouard
*Assistant Examiner*—Chuck Huynh
(74) *Attorney, Agent, or Firm*—Fitch Even Tabin & Flannery (57) ABSTRACT

A system is provided for scheduling data from a network element (101), such as an RNC (101), of a cellular communication system to at least one base station (103) across a shared communication link (105) shared between a plurality of cell sectors (107-111). The apparatus comprises resource allocators (113, 115, 117) each of which schedules data for a single cell sector (107-111). A resource determination processor (119) dynamically determines a resource requirement parameter for at least one of the cell sectors (107-111). The resource determination processor (119) is coupled to a resource assignment processor (121) which dynamically assigns a resource availability of the shared communication link (105) to each of the resource allocators (113, 115, 117) in response to the resource requirement parameter. The resource allocators (113, 115, 117) then schedule data for communication over the shared communication link in response to the resource availability. The invention provides improved utilisation of a shared communication link (105) while allowing independent scheduling by resource allocators associated with a single cell.

35 Claims, 3 Drawing Sheets

SCHEDULING DATA ACROSS A SHARED COMMUNICATION LINK IN A CELLULAR COMMUNICATION SYSTEM

FIELD OF THE INVENTION

The invention relates to an apparatus and method for scheduling data from a network element of a cellular communication system to at least one base station across a communication link shared between a plurality of cell sectors.

BACKGROUND OF THE INVENTION

In a cellular communication system, a geographical region is divided into a number of cells each which are served by base stations. The base stations are interconnected by a fixed network which can communicate data between the base stations. A mobile station is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the $2^{nd}$ generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, $3^{rd}$ generation systems are being rolled out to further enhance the communication services provided to mobile users. The most widely adopted $3^{rd}$ generation communication systems are based on Code Division Multiple Access (CDMA) and Frequency Division Duplex (FDD) or Time Division Duplex (TDD). In CDMA systems, user separation is obtained by allocating different spreading and scrambling codes to different users on the same carrier frequency and in the same time intervals. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a $3^{rd}$ generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) which control the Node Bs and the communication over the air interface.

The RNC performs many of the control functions related to the air interface including radio resource management and routing of data to and from appropriate Node Bs. It further provides the interface between the RAN and the core network. An RNC and associated Node Bs is known as a Radio Network Subsystem (RNS).

The interface between the RNC and the Node B is known as the Iub interface. As much of the functionality associated with communicating over the air interface is implemented in the RNC, and as the air interface traffic data is routed to the RNC, a significant amount of data is transferred across the Iub interface. Accordingly, high capacity communication links between RNCs and Node Bs are required.

Specifically for the 3GPP UTRAN (UMTS Terrestrial Radio Access Network), packet data for downlink transmission is buffered at the RNC and transmissions are also scheduled at the RNC. The scheduler is part of the RRC (RRC—Radio Resource Control) protocol. Typically, scheduling for each cell is performed autonomously and without direct communication between the different schedulers. Scheduled data is passed from the RNC to the Node B over the Iub interface. Uplink packet data is also scheduled by the RNC and traverses the Iub in the opposite direction.

In most cellular communication systems, the cost of the communication links between the RNCs and the Node Bs is one of the most significant operating and roll out costs associated with a cellular communication system. Therefore, it is desirable to use any communication capacity of the Iub communication links as efficiently as possible to reduce back-haul costs. One approach for reducing back-haul costs is to share an Iub communication link between different cells, cell sectors or base stations. For example, two or more cells may share a single E1 leased line offering 2 Mb/s in each direction.

In some deployments where the Iub communication links are shared these may be dimensioned to support less than the aggregate air interface capacity of the subtended cells. For example, three cells could share a single E1 leased line offering 2 Mb/s in each direction (a typical 3GPP cell has a capacity of the order of 1 Mb/s in each direction). In this case, in a simple equal sharing of the Iub, each cell is allocated a third of the capacity of the E1 link resulting in each cell having a capacity of ⅔ Mb/s in each direction.

Although such an approach may provide cost savings, it may also result in reduced performance of the cellular communication system. For example, a highly loaded cell may require 1 Mb/s in each direction to support the current traffic load. As this is not available due to the restriction of the shared Iub connection, the effective capacity of the cell is reduced thereby resulting in a reduction of the capacity of the cellular communication system as a whole.

As another example, the sharing of the communication link is very inflexible and may result in the loading of one cell being restricted by the allocated capacity of the shared link while another cell is not fully using the capacity available to it. Thus, a situation may result where the loading of a cell is limited by an Iub communication link having spare capacity.

An improved system for scheduling data from a network element, such as an RNC, to base station(s) serving a plurality of cell sectors would be advantageous and in particular a scheduling approach allowing for increased flexibility, increased performance, low complexity and/or an improved utilisation of a shared communication link would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for scheduling data from a network element of a cellular communication system to at least one base station across a shared communication link shared between a plurality of cell sectors; the apparatus comprising: a plurality of resource allocators, each resource allocator being operable to schedule data for a single cell sector of the plurality of cell sectors; resource determining processor for dynamically determining a resource requirement parameter for at least one cell sector of the plurality of cell sectors; and assignment processor for dynamically assigning a resource availability of the shared communication link to each of the plurality of resource allocators in response to the resource requirement parameter; wherein the resource allocators are operable to schedule data for communication over the shared communication link in response to the resource availability.

The invention may allow a more efficient use of a shared communication link. A cost of providing a communication link between the network element and at least one base station may be reduced as less average bandwidth may be required. An increased capacity of individual cell sectors may be increased. The communication resource of the shared communication channel may be more efficiently assigned to individual cell sectors which require it. The amount of unused capacity of the shared communication channel may be reduced. In particular, in some embodiments, the invention may allow that resource not used by one cell sector may be identified and efficiently assigned to another cell sector. The invention may allow a flexible resource allocation and sharing between different cell sectors. Additionally or alternatively, the invention may allow a low complexity and/or easy to implement resource scheduling for a shared communication link to at least one base station. Specifically, the invention may thus allow resource allocators to schedule data for communication over the air interface whilst respecting yet effectively utilising the bandwidth limitations of the shared communication link.

The invention may in particular provide a flexible sharing of resource of the shared communication link while allowing resource allocators to schedule data independently of other resource allocators. The resource availability may in particular indicate the maximum resource that can be used by the individual resource allocator. The resource availability may typically be different for at least some of the resource allocators.

The term cell sector may include cells. For example, the plurality of cell sectors may correspond to different cell sectors of the same sectorized cell where each cell sector has an associated resource allocator. Alternatively or additionally, a cell sector may include a plurality of (sub) cell sectors for which a single combined resource allocation is performed by a resource allocator. For example, in some embodiments, data for each cell may be scheduled separately from other cells but by a resource allocator performing a combined scheduling for all cells sectors of the cell. Hence, the term cell sector may include a group of cell sectors. The network element may be a Radio Network Controller. The resource requirement parameter may relate to a past, current or future resource requirement of a resource allocator. For example, the resource requirement parameter may be a measure of an amount of data to be scheduled by a resource allocator or may be a measure of an amount of resource which has been used by a resource allocator.

The apparatus may be a Radio Network Controller (RNC) of a cellular communication system.

According to an optional feature of the invention, the assignment processor is operable to sequentially assign resource availability to the resource allocators in response to a resource usage of at least one previous resource allocator.

The previous resource allocator is a resource allocator earlier in the sequence than the resource allocator for which a resource availability is assigned. The assignment processor may determine at least one sequence of all or some of the resource allocators and may assign the resource availability to each resource allocator in the order of the sequence. Following an assignment of a resource availability to a first resource allocator, the first resource allocator may schedule data before a resource availability is assigned to the following resource allocator.

The feature may allow a very efficient sharing of the shared communication link and/or provide a facilitated and low complexity allocation of the shared communication resource and/or may allow independent scheduling by the resource allocators.

According to an optional feature of the invention, the resource availability is a remaining resource availability.

The remaining resource availability for a first resource allocator may be determined in response to a resource usage of resource allocators which have already scheduled data and/or may be determined in response to the combined resource usage of resource allocators which have already scheduled data. The feature may allow an efficient sharing of the shared communication link and/or provide a facilitated and low complexity allocation of the shared communication resource. In particular, it may facilitate independent scheduling by the resource allocators while effectively and dynamically sharing the shared communication link.

According to an optional feature of the invention, the assignment processor is operable to determine a first remaining resource availability for a first resource allocator; the first resource allocator is operable to schedule data in response to the first remaining resource availability and to determine the resource requirement parameter in response to a resource usage of the scheduled data; the assignment processor is operable to determine a second remaining resource availability for a second resource allocator in response to the first remaining resource availability and the resource requirement parameter; and the second resource allocator is operable to schedule data in response to the second remaining resource availability.

The feature may allow a very efficient sharing of the shared communication link and/or provide a facilitated and low complexity allocation of the shared communication resource. In particular, it may facilitate independent scheduling by the resource allocators while sharing the shared communication link. The resource requirement parameter for a given resource allocator may specifically be a measure of the resource of the shared communication link which has been used by the given resource allocator.

According to an optional feature of the invention, the first resource allocator is operable to schedule all pending data associated with the first resource allocator. The pending data may, for example, be data stored in a data buffer associated with the first resource allocator. This may facilitate scheduling by the resource allocators and/or provide an efficient resource allocation.

According to an optional feature of the invention, the resource determining processor is operable to determine the second remaining resource availability substantially as the first remaining resource availability subtracted by the resource requirement parameter.

The resource requirement parameter may specifically be a measure of the resource of the shared communication link which has been used by the first resource allocator. This may provide for low complexity scheduling while providing an efficient usage of the shared communication link.

According to an optional feature of the invention, the assignment processor is operable to select a subset of the plurality of resource allocators for a resource allocation round in response to the resource requirement parameter.

For example, the resource requirement parameter may comprise a resource requirement for each resource allocator and only the resource allocators having a resource requirement above a threshold may be included. The threshold may specifically be a substantially zero threshold and the subset may specifically include only resource allocators having data to schedule. This may further facilitate the scheduling of data for the shared communication link.

According to an optional feature of the invention, the assignment processor is operable to change a sequence of the resource allocators for different resource allocation rounds. A different sequence may allow the order in which the resource availability is allocated to different resource allocators to change. In some embodiments, the resource availability allocated to a first resource allocator in a first allocation round may depend on the resource usage of a second resource allocator whereas in the next allocation round, the resource availability allocated to the second resource allocator may depend on the resource usage of the first resource allocator. This may allow for an efficient and low complexity resource allocation which allows independent resource allocation.

According to an optional feature of the invention, a frequency of at least one resource allocator in a plurality of resource rounds is determined in response to a cell priority associated with the resource allocators. For example, a first resource allocator may be included more times in the plurality of resource rounds than a second resource allocator if it has a higher associated cell priority. This may allow the resource allocation to be biased towards allocation of resource to the first resource allocator in preference to the second resource allocator. The feature may allow a flexible and low complexity resource allocation wherein the plurality of cells may be prioritised.

According to an optional feature of the invention, an order of at least one resource allocator in at least one plurality of resource rounds is determined in response to a cell priority associated with the resource allocators.

For example, a first resource allocator may be included before a second resource allocator if it has a higher associated cell priority. This may allow the resource allocation to be biased towards allocation of resource to the first resource allocator in preference to the second resource allocator. The feature may allow a flexible and low complexity resource allocation wherein the plurality of cells may be prioritised.

In some embodiments, both the order and frequency are modified in response to cell priorities. The cell priority for the order setting may be the same or different than the cell priority of the frequency setting.

According to an optional feature of the invention, a cell priority of a resource allocator is determined in response to a service characteristic distribution of remote units of a cell associated with the resource allocator.

For example, the service characteristic distribution may be indicative of the distribution between remote units with a high grade of service and remote units with a low grade of service. The cell priority may be higher for cells having a higher number of remote units with a high grade of service. This may allow service characteristics to be suited to the current conditions and may, for example, allow the performance for high grade service remote units to be improved in preference to low grade service remote units.

According to an optional feature of the invention, a cell priority of a resource allocator is determined in response to a combined resource requirement associated with remote units of a cell associated with the resource allocator.

This may improve scheduling of data over the shared communication link to suit the current conditions and may improve the performance of the cellular communication system.

The combined resource requirement may be a sum of guaranteed resource allocations of the remote units of the cell associated with the resource allocator. This may improve scheduling of data over the shared communication link to suit the current conditions and may improve the performance of the cellular communication system.

According to an optional feature of the invention, the resource determining processor is operable to determine a resource requirement parameter for each of the plurality of resource allocators, the resource requirement parameter being an indication of an amount of data to be scheduled by the resource allocator; and the assignment processor is operable to assign the resource availability to a first resource allocator in response to the resource requirement parameter of the first resource allocator.

This may provide a low complexity and efficient resource scheduling which allows independent resource allocators to schedule data while providing a dynamic and flexible resource allocation for the shared communication link.

According to an optional feature of the invention, the assignment processor is operable to assign a resource availability only to a first set of resource allocators which have a resource requirement parameter indicating that the resource allocator has an amount of data to schedule above a threshold.

This may facilitate the scheduling and may improve the resource allocation of the shared communication link.

According to an optional feature of the invention, the assignment processor is operable to assign a total resource availability of the shared communication link substantially equally between the first set of resource allocators. This may provide a very simple yet efficient scheduling of data for communication over the shared communication link.

According to an optional feature of the invention, the assignment processor is operable to assign an increasing resource availability to a resource allocator for an increasing amount of data to be scheduled by the resource allocator. This may for example allow an improved allocation of the resource of the shared communication link and may in particular allow resource to be allocated to cells most in need of communication over the shared communication link.

According to an optional feature of the invention, the assignment processor is operable to assign each resource allocator having data to schedule at least a minimum resource availability. This may provide a flexible and/or low complexity scheduling while guaranteeing that each cell may communicate at least a minimum amount of data across the shared communication link.

The minimum resource availability may be the same for all resource allocators or may for example be different for some or all resource allocators.

According to an optional feature of the invention, the assignment processor is operable to determine the resource availability for a resource allocator in response to the minimum resource availability of at least one other resource allocator. This may provide a practical and low complexity way of allocating resource to resource allocators while ensuring that a minimum of resource is allocated to each cell.

According to an optional feature of the invention, the assignment processor is operable to determine the minimum resource availability for a resource allocator in response to a cell priority of a cell associated with the resource allocator. An increasing minimum resource availability may be determined for increasing cell priorities thereby allowing an increasing amount of resource to be guaranteed for higher priority cells. This may allow a flexible and low complexity resource allocation which allows a variable worst case allocation of resources to individual cells.

According to an optional feature of the invention, the assignment processor is operable to reduce a total resource availability of the shared communication link in response to minimum resource availability.

For example, in embodiments using sequential scheduling based on a resource availability determined in response to an actual resource usage by previous schedulers, the resource availability assigned to the first resource allocator may correspond to the total resource availability subtracted by the sum of the minimum resource availabilities for the remaining resource allocators. This may provide a practical and low complexity way of allocating resource to resource allocators while ensuring that a minimum of resource is allocated to each cell.

According to an optional feature of the invention, in some embodiments, the apparatus further comprises a processor for determining an unused residual resource associated with the minimum resource availability; and a processor for assigning the unused residual resource to the resource allocators. This may improve the utilisation of the available resource of the shared communication link.

According to an optional feature of the invention, the shared communication link is an Iub interface connection. The shared communication link may be a shared communication link of a UMTS Terrestrial Radio Access Network (UTRAN).

According to an optional feature of the invention, the cellular communication system is a $3^{rd}$ generation cellular communication system. The cellular communication system may in particular operate in accordance with the Technical Specifications defined by the $3^{rd}$ Generation Partnership Project (3GPP)

According to a second aspect of the invention, there is provide a method of scheduling data from a network element of a cellular communication system to at least one base station across a shared communication link shared between a plurality of cells; the method comprising: each resource allocator of a plurality of resource allocators scheduling data for a single cell of the plurality of cells; dynamically determining a resource requirement parameter for at least one cell of the plurality of cells; and dynamically assigning a resource availability of the shared communication link to each of the plurality of resource allocators in response to the resource requirement parameter; and the resource allocators scheduling data for communication over the shared communication link in response to the resource availability.

According to an optional feature of the invention, dynamically assigning comprises sequentially assigning resource availability to the resource allocators in response to a resource usage of at least one previous resource allocator.

The previous resource allocator is a resource allocator earlier in the sequence than the resource allocator for which a resource availability is assigned. Sequentially assigning the resource availability may comprise determining at least one sequence of all or some of the resource allocators and the resource availability to each resource allocator may be assigned in the order of the sequence. Following an assignment of a resource availability to a first resource allocator, the first resource allocator may schedule data before a resource availability is assigned to the following resource allocator.

According to an optional feature of the invention, the method comprises: determining a first remaining resource availability for a first resource allocator; the first resource allocator scheduling data in response to the first remaining resource availability and determining the resource requirement parameter in response to a resource usage of the scheduled data; determining a second remaining resource availability for a second resource allocator in response to the first remaining resource availability and the resource requirement parameter; and the second resource allocator scheduling data in response to the second remaining resource availability.

The feature may allow a very efficient sharing of the shared communication link and/or provide a facilitated and low complexity allocation of the shared communication resource. In particular, it may facilitate independent scheduling by the resource allocators while sharing the shared communication link. The resource requirement parameter for a given resource allocator may specifically be a measure of the resource of the shared communication link which has been used by the given resource allocator.

According to an optional feature of the invention, the method comprises selecting a subset of the plurality of resource allocators for a resource allocation round in response to the resource requirement parameter.

For example, the resource requirement parameter may comprise a resource requirement for each resource allocator and only the resource allocators having a resource requirement above a threshold may be included. The threshold may specifically be a substantially zero threshold and the subset may specifically include only resource allocators having data to schedule. This may further facilitate the scheduling of data for the shared communication link.

According to an optional feature of the invention, dynamically determining comprises determining a resource requirement parameter for each of the plurality of resource allocators, the resource requirement parameter being an indication of an amount of data to be scheduled by the resource allocator; and dynamically assigning comprises assigning the resource availability to first resource allocator in response to the resource requirement parameter of the first resource allocator.

This may provide a low complexity and efficient resource scheduling which allows independent resource allocators to schedule data while providing a dynamic and flexible resource allocation for the shared communication link.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS OF THE INVENTION

The following description focuses on embodiments of the invention applicable to a UMTS $3^{rd}$ generation cellular communication system but it will be appreciated that the invention is not limited to this application but may be applied to many other communications systems.

Figure 1:
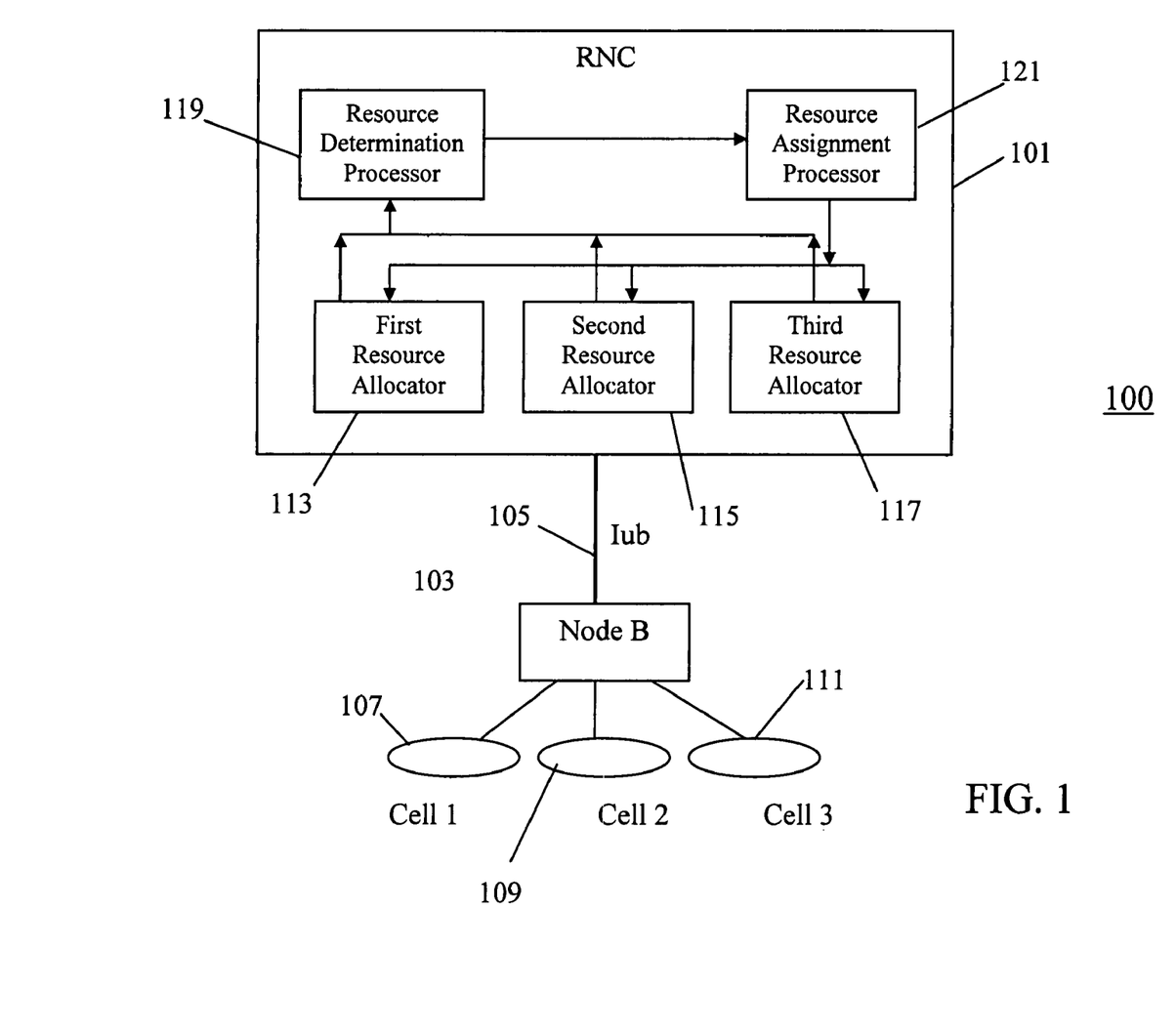
FIG. 1 illustrates elements of a UMTS communication system comprising an apparatus for scheduling data in accordance with embodiments of the invention.

FIG. 1 illustrates elements of a UMTS communication system 100 comprising an apparatus for scheduling data in accordance with an embodiment of the invention.

The communication system 100 comprises an RNC 101 which is connected to a base station (Node B) 103 through a shared communication link 105. The base station 103 supports three cells 107, 109, 111 which may be different cell sectors of one cell or may for example be cells of different hierarchical layers (such as macro and micro cells) or geographically displaced cells.

The RNC 101 comprises functionality for scheduling data for communication over the air interface. In particular, the RNC 101 comprises individual resource allocators for each of the cells served by the base station 103. Thus, in the embodiment of FIG. 1, a first resource allocator 113 schedules data for a first cell 107, a second resource allocator 115 schedules data for a second cell 109 and a third resource allocator 117 schedules data for a third cell 111. Each of the resource allocators schedule data independently of any scheduling performed by the other resource allocators. Thus, the first resource allocator 113 schedules data for the first cell 107 without consideration of the scheduling of data for the second and third cell 109, 111. The separate scheduling provides for reduced complexity of the scheduling operation.

The shared communication link 105 communicates the scheduled data for all cells 107, 109, 111 between the RNC 101 and the base station 105. Thus, the shared communication link 105 is shared between a plurality of resource allocators 113, 115, 117 and a plurality of cells/cell sectors 107, 109, 111.

The resource allocators 113, 115, 117 may in different embodiments schedule data in the uplink direction and/or in the downlink direction. For brevity and clarity, the description will mainly focus on downlink transmission of data but it will be appreciated that the invention is not limited to this example but may be applied to for example uplink communications.

It will be appreciated that although the above description has included only one base station supporting a plurality of cells or cell sectors, the RNC may in other embodiments include resource allocators and scheduling functionality for other base stations and/or other cells or cell sectors and that the shared communication link may be shared by resource allocators associated with different base stations, cells and/or cell sectors.

The resource allocators 113, 115, 117 individually schedule data for transmission over the air interface of the individual cells 107, 109 and 111. However, the data is communicated over the shared communication link 105 and consequently the resource of the shared communication link 105 used by one resource allocator affects the resource which may be used by another resource allocator. A conventional solution to this problem is to statically allocate a resource of the shared communication link 105 to each of the resource allocators 113, 115, 117. If the statically allocated resource is larger than the peak requirement of each resource allocator 113, 115, 117, the scheduling by each resource allocator 113, 115, 117 may be performed without consideration of the limitations of the shared communication link 105. However, this requires a high bandwidth of the shared communication link 105 resulting in a high cost.

However, by reducing the statically allocated resource, the resource allocators 113, 115, 117, and thus the capacity of the cells, may be limited by the shared communication link 105. Furthermore, as the resource allocators 113, 115, 117 perform an independent resource allocation, one resource allocator may be limited by the shared communication link 105 despite another resource allocator not fully using the bandwidth reserved for it.

In accordance with some embodiments of the invention, the RNC 101 determines a resource availability for each of the resource allocators 113, 115, 117. The resource allocators 113, 115, 117 then independently schedule data up to the level of the assigned resource availability. The resource availability is dynamically modified in response to a resource requirement parameter which is dynamically determined to provide a measure of the bandwidth of the shared communication link 105 which is used or required or desired by each resource allocator. Hence, a dynamic and flexible sharing of the bandwidth of the shared communication link 105 is achieved while allowing each resource allocator to schedule data independently of the other resource allocators.

In particular, the RNC 101 comprises a resource determination processor 119 which dynamically determines a resource requirement parameter for at least one cell of the plurality of cells. In the example of FIG. 1, the resource determination processor 119 is coupled to the three resource allocators 113, 115, 117 and is operable to determine a resource requirement parameter indicative of a required bandwidth of the shared communication link 105 for each of the resource allocators 113, 115, 117. The resource requirement parameter may for example comprise a measure of the amount of data to be scheduled by each of the three resource allocators 113, 115, 117 or may comprise a measure of an amount of data which has been scheduled by one or more of the three resource allocators 113, 115, 117.

The resource determination processor 119 is coupled to a resource assignment processor 121 which dynamically assigns a resource availability of the shared communication link to each of the plurality of resource allocators in response to the resource requirement parameter received from the resource determination processor 119. The resource availability for a given resource allocator provides an indication of the resource which is available for the resource allocator.

The resource assignment processor 121 is coupled to the three resource allocators 113, 115, 117 which are each fed a resource availability. In response, the resource allocators schedule data for communication over the shared communication link taking the assigned resource availability into account.

It will be appreciated that the determination of the resource requirement parameter, the resource availability and the scheduling of data by the resource allocators may be at least partly in parallel or at least partly in sequence and that any suitable sequence or order of the operations may be used.

For example, the resource requirement parameter may be determined for all resource allocators before being passed to the resource assignment processor 121. The resource assignment processor 121 may then determine a resource availability for each of the resource allocators 113, 115, 117 and feed these to the resource allocators. The resource allocators 113, 115, 117 may then proceed to schedule data independently of each other and using the provided resource availability.

In other embodiments, a more sequential approach may for example be used wherein the resource parameter requirement is determined in response to a scheduling which has already been performed by a resource allocator. The resource availability may be determined for a given resource allocator only after scheduling has been performed by one or more of the other resource allocators.

The resource availability may be expressed in any suitable form such as for example as a number of data packets or a data amount which may be scheduled for communication over the air interface or may for example be an indication of the proportion of the bandwidth of the shared communication link 105 which may be used by the resource allocator. Hence, the resource availability for a resource allocator may provide an upper limit for the resource that can be used by the resource allocator when scheduling data. Hence, the resource availability may be used as a restriction of the scheduling performed by the resource allocator. However, the resource allocator may schedule data up to a resource usage corresponding to the resource availability independently of the operation of other resource allocators.

Accordingly, a very flexible approach may be achieved which permits a dynamic and flexible sharing of the available bandwidth of the shared communication link while allowing the individual resource allocators to operate independently of other resource allocators.

Figure 2:
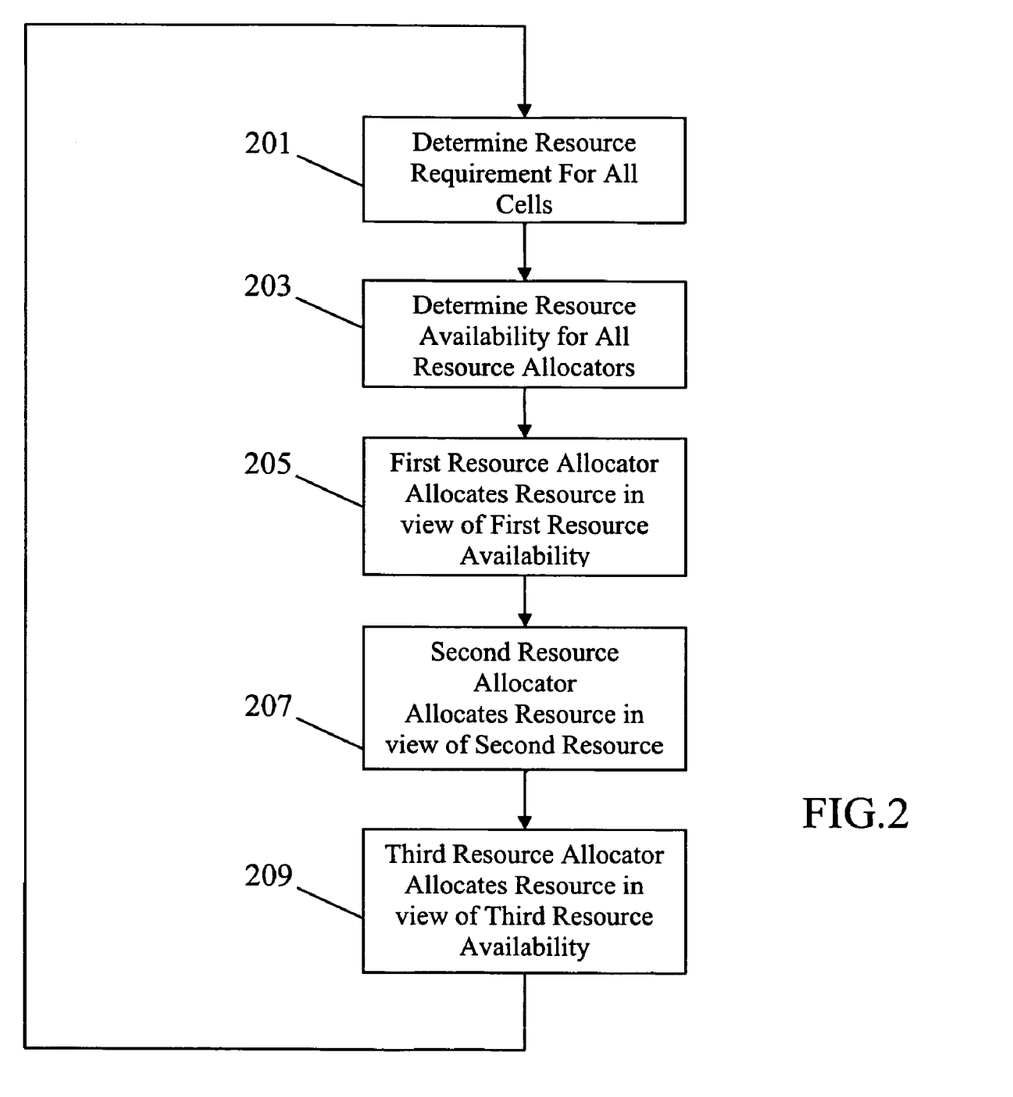
FIG. 2 illustrates a method of scheduling data in accordance with embodiments of the invention.

FIG. 2 illustrates a method of scheduling data in accordance with some embodiments of the invention. The method may specifically be performed by the RNC 101 of FIG. 1 and will for clarity be described with reference to this.

In step 201, a resource requirement is determined for all of the cells, i.e. for each of the three resource allocators 113, 115, 117. In the method of FIG. 2, the resource requirement parameter is specifically an indication of an amount of data which is to be scheduled by the individual resource allocators 113, 115, 117.

In some embodiments, each of the three resource allocators 113, 115, 117 may for each resource allocation round provide the resource determination processor 119 with a measure of the current loading of the transmit buffer of the cell of the resource allocator (or of the combined loading of transmit buffers of the remote units of cell for an uplink scheduling). The buffer loading represents the amount of data that the resource allocator seeks to schedule in the current scheduling round for transmission in the cell by the base station 103. Accordingly, the resource determination processor 119 determines a resource requirement parameter comprising a measure of the amount of pending data for each resource allocator.

Step 201 is followed by step 203 wherein the resource assignment processor 121 determines a resource availability for each of the resource allocators in response to the resource requirement parameter received from the resource determination processor 119.

In some embodiments, the resource assignment processor 121 may simply divide a total resource availability between the resource allocators in response to the amount of pending data. For example, the resource availability of resource allocator N may be determined as $$B_N = B_{TOT} \cdot \frac{V_N}{\sum_i V_i}$$

where $B_{TOT}$ is the total resource availability and $V_i$ is the amount of data to be scheduled for resource allocator i.

For example, if the first resource allocator 113 has twice as much data to transmit than each of the second and third resource allocators 115, 117, the resource availability for the first resource allocator is 50% of the total bandwidth of the shared communication link 105 and the resource availability for the second and third resource allocators 115, 117 is 25% of the total bandwidth of the shared communication link 105.

Thus, in the example the resource assignment processor 121 assigns an increasing resource availability to a resource allocator for an increasing amount of data to be scheduled by the resource allocator.

The resource availability for each resource allocator 113, 115, 117 is fed to each of the resource allocators 113, 115, 117.

In some embodiments, the resource assignment processor 121 may determine a resource availability in response to whether the resource schedulers 113, 115, 117 have any pending data or not. Specifically, the resource assignment processor 121 may for each resource allocator 113, 115, 117 determine if the resource requirement parameter indicates that the resource allocator 113, 115, 117 has an amount of data to schedule above a given threshold. In the example, the resource assignment processor 121 may only include the resource allocators for which the threshold is exceeded. For example, for a substantially zero threshold, the resource assignment processor 121 may allocate a resource availability to all resource allocators 113, 115, 117 which have any pending data but not to the resource allocators 113, 115, 117 which do not have pending data.

In some embodiments, the resource assignment processor 121 may simply assign a total resource availability of the shared communication link substantially equally between the resource allocators 113, 115, 117 which have pending data. Thus, in the specific example of FIG. 2, the resource assignment processor 121 obtains an indication of whether there is data queued in each cell 107, 109, 111. If all of the three cells 107, 109, 111 have data queued, the resource assignment processor 121 sends a resource availability to each resource allocator 113, 115, 117 indicating that the available bandwidth is $B_{TOT}/3$. However, if only two of the cells have data queued, the resource assignment processor 121 sends a resource availability to the two associated resource allocators indicating an available bandwidth of $B_{TOT}/2$, and sends a message to the other resource allocator indicating no available bandwidth. If only one cell has data queued, the associated resource allocator is assigned a bandwith of $B_{TOT}$ and the other resource allocators are allocated zero bandwidth.

Step 203 is followed by step 205 wherein the first resource allocator 113 schedules the pending data in response to the resource availability allocated to the first resource allocator 113. Thus, the first resource allocator 113 may proceed to schedule data using any suitable scheduling algorithm. However, the scheduling is performed with the restriction that the resource availability is not exceeded. Hence, if the transmit buffer of the first resource allocator 113 comprises more pending data than can be encompassed by the allocated resource availability, some data cannot be scheduled and remains in the transmit buffer for the next scheduling round.

Step 207 corresponds to step 205 for the second resource allocator 115. Accordingly, the second resource allocator 115 schedules any pending data under the restriction that the resource availability allocated to the second resource allocator 115 is not exceeded.

Step 209 corresponds to step 205 and 207 for the third resource allocator 117. Accordingly, the third resource allocator 117 schedules any pending data under the restriction that the resource availability allocated to the third resource allocator 117 is not exceeded.

It will be appreciated that in some embodiments, steps 205, 207 and 209 are performed in parallel whereas the may be performed sequentially in other embodiments.

Accordingly the method of FIG. 2 provides a simple and low complexity way of dynamically and flexibly sharing the bandwidth of the shared communication link 105 while allowing each of the resource allocators 113, 115, 117 to operate independently of other resource allocators 113, 115, 117. The method may provide a more efficient utilisation of the communication capacity of the shared communication link 105 and may thus result in decreased roll out and/or operating costs. The capacity of the cells and thus the communication system as a whole may be increased.

Figure 3:
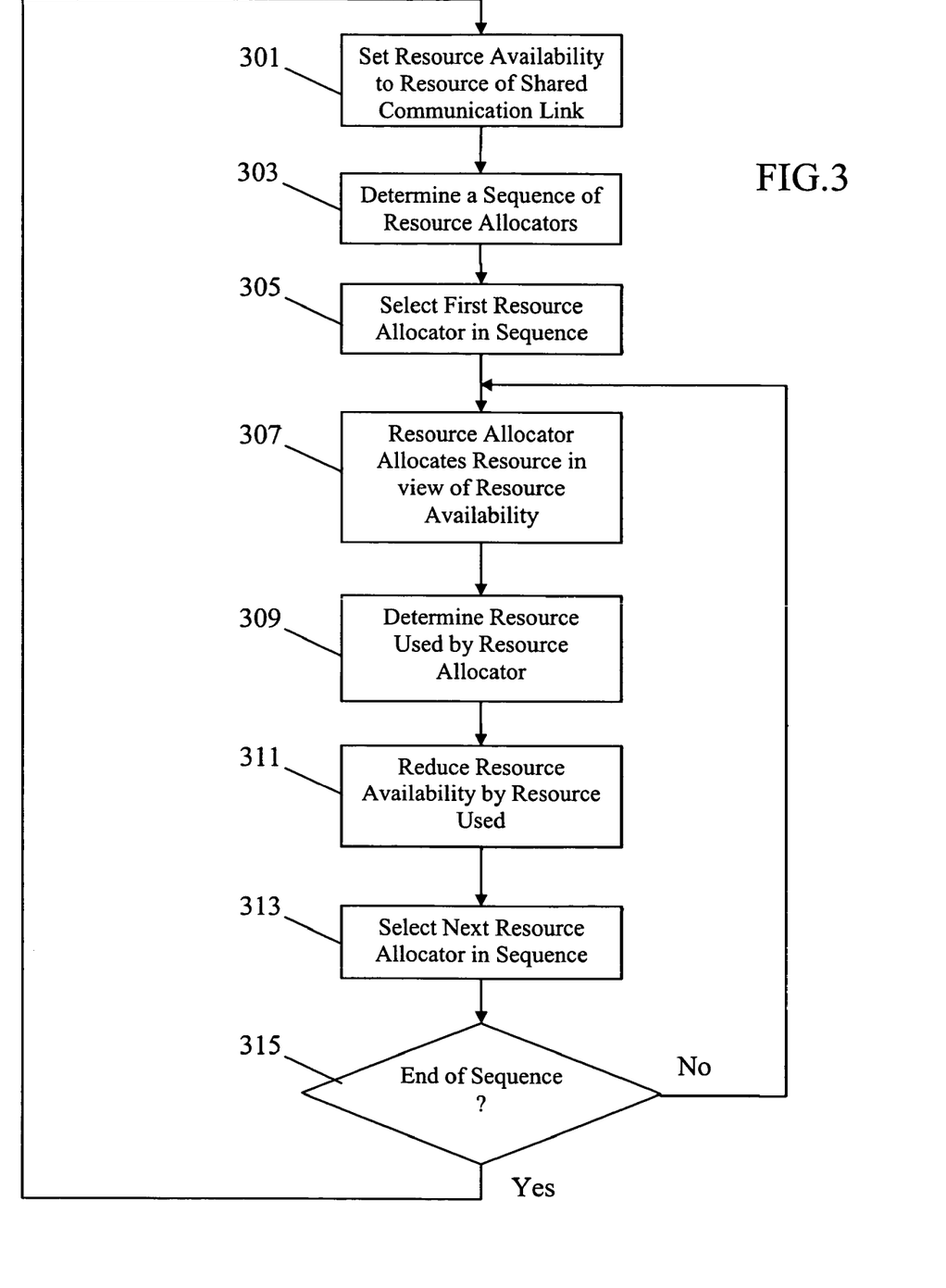
FIG. 3 illustrates a method of scheduling data in accordance with embodiments of the invention.

FIG. 3 illustrates a method of scheduling data in accordance with some embodiments of the invention. The method may specifically be performed by the RNC 101 of FIG. 1 and will for clarity be described with reference to this.

In the method of FIG. 3, the resource assignment processor 121 sequentially assigns a resource availability to the resource allocators 113, 115, 117. The resource availability assigned to one resource allocator is determined in response to a resource usage of at least one previous resource allocator which has already performed a scheduling of data.

In step 301, a remaining resource availability for the resource allocators 113, 115, 117 is set to correspond to the maximum bandwidth of the shared communication link 105 which may be used by a single resource allocator. In some embodiments, a single resource allocator may use all the available bandwidth and the remaining resource availability may in some such embodiments be set to the value corresponding to the total capacity of the shared communication link 105.

Step 301 is followed by step 303 wherein a sequence of the resource allocators 113, 115, 117 is determined. For example, an initial sequence of the first resource allocator 113 followed by the second resource allocator 115 followed by the third resource allocator 117 may be determined.

Step 303 is followed by step 305 wherein the initial resource allocator in the sequence is selected. In the specific example, the first resource allocator 113 is thus selected.

Step 305 is followed by step 307 wherein the selected resource allocator is provided with the remaining resource availability. The selected resource allocator then proceeds to schedule data for communication over the shared communication link 105 and transmission by the base station 103. For the initial resource allocator of the sequence, the remaining resource availability may be a resource availability corresponding to the full bandwidth of the shared communication link 105.

The selected resource allocator proceeds to schedule pending data in accordance with any suitable scheduling criterion or algorithm while ensuring that the remaining resource availability is not exceeded. In the specific example, if the selected resource allocator has more pending data than can be accommodated within the remaining resource availability, the maximum amount of data is scheduled and the remaining data is left in the buffer for a subsequent scheduling round. Otherwise, the selected resource allocator proceeds to schedule all the pending data and to empty the transmit buffer.

Step 307 is followed by step 309 wherein the amount of resource which has been used by the selected resource allocator is determined. In particular, the selected resource allocator may set a resource requirement parameter to indicate the resource availability which has been used to schedule the pending data.

Step 309 is followed by step 311 wherein a remaining resource availability following the scheduling by the selected resource allocator is determined. Specifically, the previously determined remaining resource availability may be reduced by the amount used by the selected resource allocator. The updated remaining resource availability thus provides an indication of how much resource may be available to subsequent resource allocators in the sequence.

Step 311 is followed by step 313 wherein the next resource allocator in the sequence is selected. In the specific example, the second resource allocator 115 is thus selected after scheduling has been performed by the first resource allocator 113.

Step 311 is followed by step 313 wherein it is determined if the end of the sequence has been reached. If not, the method returns to step 307 and proceeds with the scheduling for the next resource allocator in the sequence, i.e. for the second resource allocator 115 in the specific example. If the end of the sequence has been reached, the method returns to step 301 and begins a new scheduling round.

Hence, in the sequential operation of the method of FIG. 3, each resource allocator 113, 115, 117 is sequentially assigned a remaining resource availability and independently performs scheduling in response to the remaining resource availability. As resource is used by the resource allocators, the amount of resource available to subsequent resource allocators is calculated dependent on the actual use by the previous resource allocators. Hence a very flexible and efficient scheduling system may be achieved.

In some embodiments, not all resource allocators 113, 115, 117 may be included in the scheduling round. For example, the resource assignment processor 121 may select a subset of the resource allocators 113, 115, 117 for a resource allocation round in response to a resource requirement of the resource allocators 113, 115, 117. Specifically, the resource assignment processor 121 may only include the resource allocators 113, 115, 117 which have an amount of pending data above a given threshold.

In some embodiments, the sequence of resource allocators 113, 115, 117 is changed between different allocation rounds. For example, each time step 303 is performed a new sequence may be determined in accordance with any suitable criterion or algorithm. For example, the sequences may be varied between scheduling rounds to provide a round robin chain of the resource allocators. Thus the sequences may be varied such that over a number of rounds, each resource allocator has been in every position of the sequence. In some embodiments, the sequences may be varied such that all possible sequences comprising a single entry of each resource allocator are sequentially selected.

As a specific example of a system where each resource allocator is included equally in the different positions of a sequence, the sequences may for example correspond to the following (with RA-N denotes the N'th resource allocator):

Scheduling round 1 sequence is RA1-RA2-RA3
Scheduling round 2 sequence is RA2-RA3-RA1
Scheduling round 3 sequence is RA3-RA1-RA2

Scheduling round 4 sequence is RA1-RA2-RA3

Etc.

In the example, for a bandwidth B of the shared communication link 105 of 2 Mb/s, the result of a specific exemplary scheduling operation may be illustrated as follows:

| Sequence Position | Resource Allocator | Bandwidth offered / kb/s | Bandwidth used / kb/s | Aggregate Bandwidth used / kb/s |
|---|---|---|---|---|
| | | Scheduling round 1. | | |
| 1 | 1 | 2000 | 1200 | 1200 |
| 2 | 2 | 800 | 500 | 1700 |
| 3 | 3 | 300 | 250 | 1950 |
| | | Scheduling round 2. | | |
| 1 | 3 | 2000 | 1000 | 1000 |
| 2 | 1 | 1000 | 700 | 1700 |
| 3 | 2 | 300 | 300 | 2000 |
| | | Scheduling round 3. | | |
| 1 | 2 | 2000 | 1900 | 1900 |
| 2 | 3 | 100 | 100 | 2000 |
| 3 | 1 | — | — | — |

In some embodiments, the resource allocation to different cells or cell sectors may be biased towards some cells or cell sectors in preference to other cells or cell sectors. For example, each cell may be associated with a cell priority and the resource of the shared communication link may be biased towards higher priority cells.

For example, in the example of FIG. 2, the resource availability for the different resource allocators may be modified by the respective cell priorities. For example, a different weight may be applied to the individual resource requirements depending on the cell priorities.

In the example of FIG. 3, the sequence of resource allocators 113, 115, 117 may be modified or selected in response to the cell priorities.

In some such embodiments, a frequency of a resource allocator in the resource rounds may be determined in response to the cell priorities. For example, a high priority cell may be included in every scheduling round whereas a low priority cell may be included only in every other scheduling round.

Alternatively or additionally, an order of the resource allocators 113, 115, 117 may be determined in response to a cell priority associated with the resource allocators 113, 115, 117. For example, the higher the priority of a cell, the earlier the inclusion of the associated resource allocator in the sequence of resource allocators 113, 115, 117.

In some embodiments, both the frequency and the order of the resource allocators 113, 115, 117 may be determined in response to associated cell priorities.

As a specific example, the round robin sequence may be adjusted such that the frequency at which a cell is served first is adjusted according to a cell priority. For example, if the first cell has a higher cell priority than the second and third cells, it may be served first in three out of seven scheduling rounds, whilst the second and third cells are served first in two out of seven scheduling rounds:

Scheduling round 1 sequence is RA1-RA2-RA3

Scheduling round 2 sequence is RA2-RA3-RA1

Scheduling round 3 sequence is RA3-RA1-RA2

Scheduling round 4 sequence is RA1-RA2-RA3

Scheduling round 5 sequence is RA1-RA3-RA2

Scheduling round 6 sequence is RA2-RA3-RA1

Scheduling round 7 sequence is RA3-RA1-RA2

Etc.

The cell priority may be determined in accordance with any suitable criterion or algorithm.

In some embodiments, the cell priority of a cell and associated resource allocator may be determined in response to a service characteristic distribution of remote units of a cell associated with the resource allocator.

For example, the communication system may allow three quality of service grades to be provided. E.g, gold users are provided with a high grade of service at a high cost, silver users are provided with a medium grade of service at a medium cost, and bronze users are provided with a low grade of service at a low cost. In this case, a possible cell priority metric may be determined as m1*sum of number of bronze users admitted+m2*sum of number of silver users admitted+m3*sum of number of gold users admitted, where m1 to m3 are suitable weights and m1<m2<m3. In this case, an increasing cell priority is obtained for cells having a high number of gold users at the expense of other cells. Thus, the limited resource of the shared communication link is flexibly biased towards the high grade users.

In some embodiments, the cell priority may be determined in response to a combined resource requirement associated with remote units of the individual cell associated with the resource allocator. For example, each user may be allocated a certain minimum data rate associated with a gold user, a silver user and a bronze user respectively. For each cell, the guaranteed resource allocations of the remote units, which are currently associated with a cell, may be added together to provide a cell priority.

In some embodiments, each resource allocator 113, 115, 117 meeting a given criterion may be guaranteed a minimum bandwidth of the shared communication link 105. In some such embodiments, such a criterion may simply be that the resource allocator is operational such that all resource allocators are allocated bandwidth of the shared communication link 105 regardless of whether they have data to schedule or not.

In other such embodiments, the criterion may be that the resource allocators 113, 115, 117 have pending data to schedule. Specifically, the resource assignment processor 121 may, for example, be configured to assign each resource allocator 113, 115, 117 having data to schedule, at least a minimum resource availability.

The resource assignment processor 121 may in such embodiments be configured to determine the resource availability for a given resource allocator by taken into account that resource must be reserved for other resource allocators. Thus, the resource availability for one resource allocator may be reduced by subtracting the minimum resource availability associated with the other resource allocators. As an example, step 301 of the method of FIG. 3 may include a determination of the initial remaining resource availability as the total resource availability of the shared communication link subtracted by the sum of the minimum resource availabilities of the resource allocators; or step 311 of the method of FIG. 3 may include reducing the remaining resource availability by a the sum of the minimum resource availabilities of the remaining resource allocators.

More specifically, the resource availability $B_A$ for resource allocator n may be determined by:

$$B_{A,n} = B_{TOT} - B_{guaranteed}(N_a - n) - \sum_{i=1}^{n-1} B_{used,i}$$

where $B_{Tot}$ is the total resource availability of the shared communication link, $B_{Guranteed}$ is the minimum resource availability for each cell, $N_a$ is the number of resource allocators sharing the shared communication link in the current scheduling round and $B_{used,i}$ is the resource already used by resource allocator i.

In some embodiments, the minimum resource availability may be static and identical for all resource allocators. However, in other embodiments, the minimum resource availability may be varied dynamically in response to a suitable criterion or algorithm. For example, the minimum resource availability of a resource allocator may be varied in response to an associated cell priority e.g. by multiplying a given minimum resource availability reference by the current cell priority metric.

At the end of a scheduling round, some of the resource reserved for the minimum resource availability of the resource allocators will typically not be used. Accordingly, the residual resource which has not been used may be determined. The residual resource may then be allocated to other resource allocators in accordance with any suitable algorithm or criterion. For example, the remaining resource availability may be set to the residual resource, the first resource allocator of the sequence may be selected and steps 307 to 315 may be repeated until the residual resource has been fully used or all data has been scheduled by all resource allocators.

As a specific example, the guaranteed bandwidth per active cell is set greater than zero at 500 kb/s and the capacity of the shared communication link is again set to 2 Mb/s. In the example, any (guaranteed) bandwidth which a cell does not use is made available for the remaining cells. This results in a smaller variation in bandwidth offered to a given cell from one scheduling round to another.

| Sequence Position | Resource Allocator | Bandwidth offered / kb/s | Bandwidth used / kb/s | Aggregate Bandwidth used / kb/s |
|---|---|---|---|---|
| Scheduling round 1. | | | | |
| 1 | 1 | 1000 | 1000 | 1000 |
| 2 | 2 | 500 | 500 | 1500 |
| 3 | 3 | 500 | 250 | 1750 |
| Scheduling round 2. | | | | |
| 1 | 3 | 1000 | 1000 | 1000 |
| 2 | 1 | 500 | 500 | 1500 |
| 3 | 2 | 500 | 300 | 1800 |
| Scheduling round 3. | | | | |
| 1 | 2 | 1000 | 1000 | 1000 |
| 2 | 3 | 500 | 200 | 1200 |
| 3 | 1 | 800 | 600 | 1800 |

It will be appreciated that the above description for clarity has described embodiments of the invention with reference to different functional units and processors. However, it will be apparent that any suitable distribution of functionality between different functional units or processors may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather implies that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. An apparatus for scheduling data from a Radio Network Controller (RNC) element of a cellular communication system to at least one base station, the apparatus comprising:
   a plurality of resource allocators, wherein each resource allocator is operable to schedule data across a shared communication link for use by a single cell sector of a plurality of cell sectors, the shared communication link configured to communicate data between the RNC and the at least one base station;
   a resource determining processor for dynamically determining a resource requirement parameter for at least one cell sector of the plurality of cell sectors, wherein the resource requirement parameter is related to a measure of available resources of the shared communication link based on the resource requirement of each resource allocator; and
   an assignment processor for dynamically assigning a resource availability of the shared communication link to at least one of the plurality of resource allocators in response to the resource requirement parameter, wherein each resource allocator is operable to schedule data for communication across the shared communication link based on its assigned resource availability.

2. The apparatus claimed in claim 1 wherein the assignment processor is operable to sequentially assign resource availability to a resource allocator in response to a resource usage of at least one other resource allocator to which resource availability has been previously assigned.

3. The apparatus claimed in claim 2 wherein the resource availability is a remaining resource availability.

4. The apparatus of claim 3 wherein:
the assignment processor is operable to determine a first remaining resource availability for a first resource allocator;
the first resource allocator is operable to schedule data in response to the first remaining resource availability and to determine the resource requirement parameter in response to a resource usage of the scheduled data;
the assignment processor is operable to determine a second remaining resource availability for a second resource allocator in response to the first remaining resource availability and the resource requirement parameter; and
the second resource allocator is operable to schedule data in response to the second remaining resource availability.

5. The apparatus claimed in claim 4 wherein the first resource allocator is operable to schedule all pending data associated with the first resource allocator.

6. The apparatus claimed in claim 4 wherein the resource determining processor is operable to determine the second remaining resource availability substantially as the first remaining resource availability subtracted by the resource requirement parameter.

7. The apparatus claimed in claim 2 wherein the assignment processor is operable to select a subset of the plurality of resource allocators for a resource allocation round in response to the resource requirement parameter.

8. The apparatus claimed in claim 2 wherein the assignment processor is operable to change a sequence of the resource allocators for different resource allocation rounds.

9. The apparatus claimed in claim 8 wherein a frequency of at least one resource allocator in a plurality of resource rounds is determined in response to a cell sector priority associated with the resource allocators.

10. The apparatus claimed in claim 8 wherein an order of at least one resource allocator in at least one of the plurality of resource rounds is determined in response to a cell sector priority associated with the resource allocators.

11. The apparatus claimed in claim 9 wherein a cell sector priority of a resource allocator is determined in response to a service characteristic distribution of remote units of a cell sector associated with the resource allocator.

12. The apparatus claimed in claim 9 wherein a cell sector priority of a resource allocator is determined in response to a combined resource requirement associated with remote units of a cell sector associated with the resource allocator.

13. The apparatus claimed in claim 12 wherein the combined resource requirement is a sum of guaranteed resource allocations of the remote units of the cell sector associated with the resource allocator.

14. The apparatus claimed in claim 1 wherein the resource determining processor is operable to determine a resource requirement parameter for each of the plurality of resource allocators, the resource requirement parameter being an indication of an amount of data to be scheduled by the corresponding resource allocator; and wherein the assignment processor is operable to assign a resource availability to a first resource allocator in response to the resource requirement parameter of the first resource allocator.

15. The apparatus claimed in claim 1 wherein the assignment processor is operable to assign a resource availability only to a first set of resource allocators each of which has a resource requirement parameter indicating that the resource allocator has an amount of data to schedule above a threshold.

16. The apparatus claimed in claim 15 wherein the assignment processor is operable to assign a total resource availability of the shared communication link substantially equally between resource allocators within the first set of resource allocators.

17. The apparatus claimed in claim 14 wherein the assignment processor is operable to assign an increasing resource availability to a resource allocator for an increasing amount of data to be scheduled by the resource allocator.

18. The apparatus as claimed in claim 1 wherein the assignment processor is operable to assign each resource allocator having data to schedule at least a minimum resource availability.

19. The apparatus as claimed in claim 18 wherein the assignment processor is operable to determine the resource availability for a resource allocator in response to the minimum resource availability of at least one other resource allocator.

20. The apparatus as claimed in claim 18 wherein the assignment processor is operable to determine the minimum resource availability for a resource allocator in response to a cell sector priority of a cell sector associated with the resource allocator.

21. The apparatus as claimed in claim 18 wherein the assignment processor is operable to reduce a total resource availability of the shared communication link in response to the minimum resource availability.

22. The apparatus as claimed in claim 18 further comprising: means for determining an unused residual resource associated with the minimum resource availability; and means for assigning the unused residual resource to the resource allocators.

23. The apparatus claimed in claim 1 wherein the shared communication link is an Iub interface connection.

24. The apparatus claimed in claim 1 wherein the cellular communication system is a 3rd generation cellular communication system.

25. A method of scheduling data from a Radio Network Controller (RNC) element of a cellular communication system to at least one base station, the method comprising:
dynamically determining a resource requirement parameter for at least one cell sector of a plurality of cell sectors, wherein the resource requirement parameter is related to a measure of available resources of a shared communication link configured to communicate data between the RNC and the at least one base station based on the resource requirement of each resource allocator;
dynamically assigning a resource availability of the shared communication link to at least one of the plurality of resource allocators in response to the resource requirement parameter;
scheduling data for communication across the shared communication link based on the assigned resource availability for use by a single cell sector of the plurality of cell sectors.

26. The method claimed in claim 25 wherein dynamically assigning comprises assigning resource availability to a cell sector in response to a resource usage of at least one other cell sector to which resource availability has been previously assigned.

27. The method claimed in claim 26 comprising:
- determining a first remaining resource availability for a first cell sector;
- scheduling data for a first cell sector in response to the first remaining resource availability and determining the resource requirement parameter in response to a resource usage of the scheduled data;
- determining a second remaining resource availability for a second cell sector in response to the first remaining resource availability and the resource requirement parameter; and
- scheduling data for a second cell sector in response to the second remaining resource availability.

28. The method claimed in claim 26 further comprising selecting a subset of the plurality of cell sectors for a resource allocation round in response to the resource requirement parameter.

29. The method claimed in claim 25 wherein:
- dynamically determining comprises determining a resource requirement parameter for each of the plurality of cell sectors, the resource requirement parameter being an indication of an amount of data to be scheduled for the corresponding cell sector and
- dynamically assigning comprises assigning the resource availability for a first cell sector in response to the resource requirement parameter of the first cell sector.

30. A storage medium encoded with instructions, executable by a processor, for scheduling data from a Radio Network Controller (RNC) element of a cellular communication system to at least one base station, the instructions for:
- dynamically determining a resource requirement parameter for at least one cell sector of a plurality of cell sectors, wherein the resource requirement parameter is related to a measure of available resources of a shared communication link configured to communicate data between the RNC and the at least one base station based on the resource requirement of each resource allocator;
- dynamically assigning a resource availability of the shared communication link to at least one of the plurality of resource allocators in response to the resource requirement parameter;
- scheduling data for communication across the shared communication link based on the assigned resource availability for use by a single cell sector of the plurality of cell sectors.

31. The storage medium of claim 30 wherein dynamically assigning comprises sequentially assigning resource availability to a cell sector in response to a resource usage of at least one other cell sector to which resource availability has been previously assigned.

32. The storage medium of claim 31 further encoded with instructions, executable by a processor, for:
- determining a first remaining resource availability for a first cell sector;
- scheduling data for a first cell sector in response to the first remaining resource availability and determining the resource requirement parameter in response to a resource usage of the scheduled data;
- determining a second remaining resource availability for a second cell sector in response to the first remaining resource availability and the resource requirement parameter; and
- scheduling data for a second cell sector in response to the second remaining resource availability.

33. The storage medium of claim 31 further encoded with instructions, executable by a processor, for selecting a subset of the plurality of cell sectors for a resource allocation round in response to the resource requirement parameter.

34. The storage medium of claim 30 further encoded with instructions, executable by a processor, for:
- determining a resource requirement parameter for the at least one cell sector, the resource requirement parameter being an indication of an amount of data to be scheduled for the corresponding cell sector; and
- assigning the resource availability for a first cell sector in response to the resource requirement parameter of the first cell sector.

35. The apparatus of claim 1 wherein the measure of available resources of the shared communication link is a measure of available bandwidth.

* * * * *